June 13, 1950     R. L. HASCHE     2,511,206
PROCESS OF PRODUCING HYDROCARBONS
Filed Dec. 8, 1945
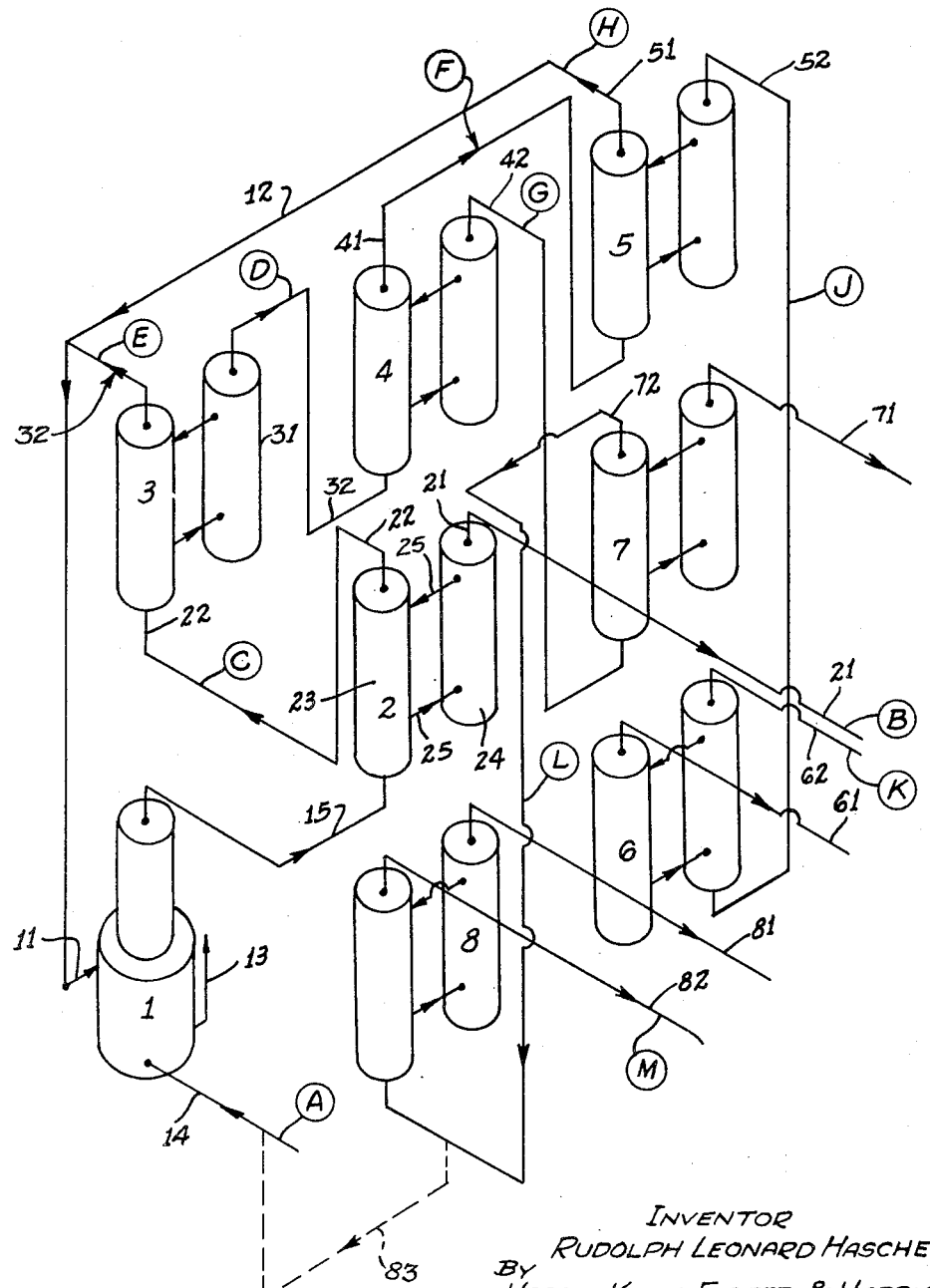
INVENTOR
RUDOLPH LEONARD HASCHE
BY HARRIS, KIECH, FOSTER & HARRIS
FOR THE FIRM
ATTORNEYS Patented June 13, 1950

2,511,206

UNITED STATES PATENT OFFICE 2,511,206

PROCESS OF PRODUCING HYDROCARBONS

Rudolph Leonard Hasche, Johnson City, Tenn., assignor to Tennessee Eastman Corporation, Kingsport, Tenn., a corporation of Virginia Application December 8, 1945, Serial No. 633,842

7 Claims. (Cl. 260—679)

This invention relates to a process for producing hydrocarbons preferably from gases or vapors containing alkanes or hydrocarbons of the methane series. It is especially but not solely applicable to the production of ethylene and acetylene or compounds formed from these gases.

It is an object of my invention to produce commercially acceptable ethylene or ethylene derivatives from the alkanes or other hydrocarbons by first cracking these materials to produce a complex cracked gas containing ethylene, and, second, separating the ethylene from the cracked gas in a sufficiently pure state to permit it to be used to produce various ethylene derivatives, such as ethyl alcohol, ethyl glycol, ethyl benzene, and the like. The term "cracking" is used broadly to denote thermal decomposition or pyrolysis.

It is a further object of my invention to produce commercially acceptable acetylene or acetylene derivatives from the alkanes or other hydrocarbons by first cracking these materials to produce a complex cracked gas containing acetylene and then separating the acetylene from said cracked gas or forming a desired acetylene derivative from said cracked gas.

The cracking herein described differs from cracking as now practiced in the petroleum industry, in the practice of which hydrogen is added to a hydrocarbon to decrease the carbon content of the product. In my process I use as a charging stock a mixture containing ethane ($C_2H_6$) and propane ($C_3H_8$) and produce from them ethylene ($C_2H_4$) and some acetylene ($C_2H_2$), the carbon content of the product being higher than that portion of the charging stock converted by the process.

In my process, when a hydrocarbon, for example, a saturated hydrocarbon of the methane series, is so cracked at high temperatures that hydrogen is freed and unsaturated products higher in carbon are produced, the cracking reaction is highly endothermic and such cracking is hereinafter some times referred to as pyrolytic decomposition.

Ethylene mixed with other gases may be, and has been, produced by subjecting hydrocarbons such as the alkanes to temperatures of approximately 1200° F. to 1400° F. for a period of from 1 to 5 seconds to produce a cracked gas containing ethylene. This procedure results in a rather low yield of ethylene, and it is an object of my invention to increase this yield by cracking the charging stock at a temperature of 1900° F. to 2400° F. for a period of not more than ½ second. By cracking the alkanes at this higher temperature, a mixed gas is produced which may contain benzene and other light oils, acetylene, propylene, hydrogen, carbon monoxide, carbon dioxide, methane, ethane, and perhaps other gases. Such a complex mixture presents a very difficult separation problem, as it is difficult to segregate some of these gases from such a complex mixture in a sufficiently high state of purity to enable the separated gases to be used in many processes in which a gas of high purity is desired. Such separation can be accomplished by liquefying the mixture or parts thereof and fractionally distilling the various gases at low temperature, which is very expensive. It is a further object of my invention to provide a process and apparatus by which ethylene, acetylene, or compounds of these gases may be produced from a complex mixture of gases, such as the complex mixtures produced by the pyrolytic decomposition of hydrocarbons without resorting to liquefaction and low temperature distillation.

It is an object of my invention not only to segregate certain of these gases from such a highly complex mixture, but also to provide means by which the gases may be separated in a satisfactorily high state of purity or in commercially acceptable form.

In the accompanying isometric diagram, the apparatus used is shown by conventional symbols which do not show either the actual size, shape, or general appearance or arrangement of the individual pieces of apparatus used, all of which are known in the art and can be readily supplied by a person skilled in the art who understands from the following description what results must be accomplished by each assembly. In the diagram, letters are used to denote specific gas mixtures found in various parts of the apparatus and hereinafter more exactly identified.

In the drawing, I is a regenerative furnace, that is, a furace that has a regenerative mass preferably formed of carborundum bricks. Hot gases of combustion are passed through passages in the mass until the mass reaches a predetermined temperature. The flow of combustion gases is then shut off, and the gas to be processed, hereinafter called "charging stock," is then passed through these passages and heated to or above a minimum desired temperature therein, the charging stock continuing to pass through the mass as long as the mass is hot enough to produce this minimum temperature. When the mass has lost heat to such a degree that the charging stock can no longer be heated to or above the minimum temperature, the flow of charging stock is shut off and the cycle of reheating and charging is repeated. In practice, two or more furnaces are used, one receiving charging stock while another is heating, so that there is a continuous delivery of treated gas from the furnaces. These furnaces operate at or near atmospheric pressure.

Fuel gas is delivered to the furnace 1 through a fuel pipe 11 from a fuel collecting pipe 12, and the gases of combustion after leaving the furnace are delivered through a pipe 13 to a stack (not shown). Charging stock is delivered to the furnace through a pipe 14, and treated gas is delivered from the furnace 1 through a pipe 15. A convenient and efficient form of regenerative furnace is shown in my copending application Serial No. 633,839, filed December 8, 1945 now Patent No. 2,432,885.

In the furnace the charging stock is heated to 1900° F. to 2400° F. The charging stock A delivered to the apparatus can conveniently be a gaseous mixture consisting of 75% propane and 25% ethane, since such mixtures are readily available, and in the following description the intermediate and final products that result when such a mixture is used will be described. Other charging stocks may, of course, be used, and it is not necessary that a pure charging stock be used, as almost all hydrocarbons can be readily processed by my invention. We will assume as an example of my process, however, that the gas A has the following analysis by volume:

| Gas A | Volume Per Cent |
|---|---|
| Propane, $C_3H_8$ | 75 |
| Ethane, $C_2H_6$ | 25 |

Gas delivered to the pipe 15 passes to a first absorption apparatus or purifier 2, in which the gas is cooled and compressed to a pressure of 300 pounds per square inch by means not shown, and contacted with a hydrocarbon oil solvent which absorbs benzene. The absorbed benzene may be recovered and delivered by the pipe 21 as a gas B, which consists of:

Gas B—benzene $C_6H_6$ or other light oil constituents.

The unabsorbed gas is delivered from the apparatus to a pipe 22. The gas C delivered through the pipe 22 will have about the following analysis:

| Gas C | Volume Per Cent |
|---|---|
| Acetylene, $C_2H_2$ | 15.1 |
| Ethylene, $C_2H_4$ | 16.1 |
| Propylene, $C_3H_6$ | 0.9 |
| Hydrogen, $H_2$ | 44.0 |
| Carbon Monoxide, CO | 2.7 |
| Methane, $CH_4$ | 20.7 |
| Ethane, $C_2H_6$ | 0.2 |
| Nitrogen, Oxygen, $N_2$, $O_2$ | 0.3 |

Gas C is rather typical of the gases resulting from pyrolytic decomposition, as it produces gases some of which are of widely different boiling points and other characteristics, and some of which are so closely related as to boiling points and other characteristics as to make segregation of some of the gases in commercially acceptable form a very difficult matter. Although pyrolytic decomposition is not new, I do not know of any plant in this country in which pyrolytic decomposition is combined with any separation steps which produce commercially acceptable acetylene, ethylene, or derivatives of these gases.

It should be understood that the purifier 2 is shown diagrammatically as two tanks, one an absorber 23 and the other a stripper 24, which are shown conected by arrows 25 to indicate that the absorbent circulates between the tanks. In practice, the solvent charged with absorbed constituents passes from the bottom of the absorber 23 to the top of the stripper 24, and the solvent from which the absorbed constituents have been removed passes from the bottom of the stripper 24 to the top of the absorber 23. In the absorber 23 the solvent is under superatmospheric pressure and at low temperature, and in the stripper 24 the solvent may be under a lower pressure and a higher temperature. Pumps, reducing valves, coolers, heaters, and other parts are used to bring about these conditions in accordance with standard practice in absorption systems, but these parts are not shown in connection with the purifier 2 or other absorption systems hereinafter described, as they are well known and understood in the art, and if shown and described would tend to complicate this specification and thus obscure the novelty residing therein.

The gas C passes to a second absorption apparatus 3, in which it is subjected to absorption in naphtha or other hydrocarbon having about the boiling range of kerosene. In the second absorber 3 certain gases are absorbed and released from the stripper 31, these absorbed gases D having about the following composition:

| Gas D | Volume Per Cent |
|---|---|
| Acetylene, $C_2H_2$ | 37.6 |
| Ethylene, $C_2H_4$ | 40.1 |
| Propylene, $C_3H_6$ | 2.2 |
| Carbon Monoxide, CO | 0.2 |
| Methane, $CH_4$ | 19.4 |
| Ethane, $C_2H_6$ | 0.5 |

A gas E passing unabsorbed through the absorber is released through a pipe 32 and delivered to the fuel manifold 12 for use as fuel. This gas will have about the following analysis:

| Gas E | Volume Per Cent |
|---|---|
| Hydrogen, $H_2$ | 73.5 |
| Methane, $CH_4$ | 21.6 |
| Carbon Monoxide, CO | 4.4 |
| Nitrogen, Oxygen, N, O | 0.5 |

It should be noted that much of the carbon monoxide and a large part of the methane are separated from the gas C in the apparatus 3 and passed off with the off-gas E through the pipe 32.

The gas D passes through the pipe 31 to apparatus 4, in which it is contacted with a solvent selective for acetylene and propylene and having a low solubility for ethylene. For example, a polyethylene glycol ether, such as dimethoxy tetraethylene glycol, may be used, in which the solubilities for acetylene, ethylene, and propylene, expressed in volumes per volume of solvent, are, respectively 11.4, 1.6, and 6.3. If the amount of solvent employed is sufficient to remove all of the propylene, this amount will likewise remove all of the acetylene and about one-fourth of the ethylene.

A gas F which passes through the apparatus 4 unabsorbed is delivered to a pipe 41 and has about the following composition:

| Gas F | Volume Per Cent |
| --- | --- |
| Ethylene, C₂H₄ | 60.5 |
| Carbon Monoxide, CO | 0.4 |
| Methane, CH₄ | 38.5 |
| Ethane, C₂H₆ | 0.6 |

A gas G which has been absorbed in the third absorbing apparatus 4 is delivered to a pipe 42 and has about the following composition:

| Gas G | Volume Per Cent |
| --- | --- |
| Acetylene, C₂H₂ | 73.2 |
| Ethylene, C₂H₄ | 20.8 |
| Propylene, C₃H₆ | 4.3 |
| Methane, CH₄ | 1.3 |
| Ethane, C₂H₆ | 0.4 |

An important feature of the process is that in the apparatus 4 all the propylene is absorbed with the acetylene and appears in the gas G, while about 75% of the ethylene passes off with the gas F unabsorbed, the gas F being substantially free from propylene. The operator should supply sufficient absorbent so that substantially all the propylene is absorbed and appears in the gas G. This gives us a desirable gas F which contains ethylene free from propylene. By operating the apparatus 4 so that substantially all the propylene is separated from the ethylene, I greatly simplify the separation problem. The gas G is a commercially acceptable gas which is predominantly acetylene and which may be used for many purposes.

The gas F is delivered by the pipe 41 to a fourth absorption apparatus 5, the absorber of which contains naphtha or a hydrocarbon having about the boiling range of kerosene. A gas H that passes unabsorbed through the absorber of the apparatus 5 is delivered through a pipe 51 to the fuel manifold 12 and has about the following composition:

| Gas H | Volume Per Cent |
| --- | --- |
| Methane, CH₄ | 98.7 |
| Carbon Monoxide, CO | 1.3 |

A gas J absorbed and released in the apparatus 5 through a pipe 52 has about the following composition:

| Gas J | Volume Per Cent |
| --- | --- |
| Ethylene, C₂H₄ | 87.0 |
| Methane, CH₄ | 12.) |
| Ethane, C₂H₆ | ). |
| Carbon Monoxide, CO | 0.0 |

The gas J is of such composition that it may be used for many purposes for which ethylene is used; for example, it may be delivered by the pipe 52 to an apparatus 6 which produces ethyl alcohol, ethylene benzene, or other ethyl compounds delivered to a pipe 61 and an off-gas delivered to a pipe 62. In other words, the gas J is a commercially acceptable ethylene. The off-gas K may have the following composition:

| Gas K | Volume Per Cent |
| --- | --- |
| Methane, CH₄ | 93.0 |
| Ethane, C₂H₆ | 7.0 |
| Carbon Monoxide, CO | Traces |

The gas K may be used as fuel either in the furnace 1 or elsewhere, or it may be used for any purpose for which methane is suited.

The gas G may be passed through the pipe 42 to an apparatus 7, where it is hydrated to produce a mixture largely acetaldehyde containing some acetone, which is delivered to a pipe 71, or in which some other acetylene derivative may be produced. An unhydrated gas L is delivered to a pipe 72 and has about the following composition:

| Gas L | Volume Per Cent |
| --- | --- |
| Ethylene, C₂H₄ | 77.7 |
| Propylene, C₃H₆ | 16.0 |
| Methane, CH₄ | 4.8 |
| Ethane, C₂H₆ | 1.5 |

The gas L may then be passed to an apparatus 8, where it is contacted with sulphuric acid to produce isopropyl alcohol delivered to a pipe 81 and thus remove the propylene. There will then be delivered through a pipe 82 a gas M having about the following composition:

| Gas M | Volume Per Cent |
| --- | --- |
| Ethylene, C₂H₄ | 93.1 |
| Methane, CH₄ | 6.7 |
| Ethane, C₂H₆ | 0.2 |

This gas M is also a commercially acceptable gas, the small dilution with methane and ethane not being objectionable in many uses to which ethylene is applied.

In the operation of the process, a hydrocarbon or a mixture of hydrocarbons is subjected to pyrolytic decomposition in the furnace 1, which necessarily produces a highly complex mixture of gases from which it has always been considered impractical to separate individual gases. If the charging stock gas A contains propane and ethane with about three times as much propane as ethane, the following products may be obtained:

First, a light oil or benzene, gas B, which is delivered by the pipe 21 (In some cases this gas may contain some carbon dioxide which is removed from the apparatus. Usually, little or no carbon dioxide is found in the mixed gas B. The amount of gas B is small if my invention is operated as described, and it may be considered as a minor by-product.);

Second, acetaldehyde containing some acetone or other acetylene derivative, which is delivered by the pipe 71;

Third, methane containing a small amount of carbon monoxide delivered by the pipe 62;

Fourth, the gas J, which consists of ethylene, methane, and a little ethane, but which is substantially free of propylene, carbon monoxide, and acetylene. It is one of the objects of my invention to produce such a gas which may be used for many purposes; for example, it may be delivered by the pipe 52 to the apparatus 6, which produces:

Fifth, the gas K consisting of methane and ethane, with a slight dilution of carbon monoxide, delivered by the pipe 62; and Sixth, ethyl alcohol delivered by the pipe 61;

Seventh, the gas L, which consists of ethylene, propylene, methane, and ethane delivered by the pipe 72. This gas may be used for many purposes; for example, it may be delivered to the apparatus 8 and contacted with sulphuric acid to produce:

Eighth, isopropyl alcohol delivered through the pipe 81; and

Ninth, the gas M, which is predominantly acetylene, but which contains some methane and ethylene.

The unabsorbed or "off" gases from the apparatus 3 and 5 are returned to the furnace 1 to be used as fuel, and will usually supply all the heat requirements of that furnace. The gas L, instead of being used to produce isopropyl alcohol in the apparatus 8, may be passed through a pipe 83 into the pipe 14, where it mixes with the charging stock and is returned to the furnace 1. If this is done, nearly, if not all, of the ethylene will be converted to acetylene, and the propylene will be largely converted to ethylene and acetylene. Such a recirculation will increase the proportion of both acetylene and ethylene in the gas C.

It will be seen that my process above described includes the step of producing a complex mixed gas by the pyrolytic decomposition of a hydrocarbon, for example, an alkane or mixture containing an alkane, this cracking being accomplished at a high temperature, for example, 1900° F. to 2400° F., at low pressure, for example, atmospheric pressure or below. Low partial pressure on the alkanes, or other gases it is desired to crack, may be produced by diluting the charging stock with steam or other inert diluent. The process also includes steps by which certain of the gases, notably ethylene and acetylene, may be recovered in suitable concentrations and other conditions to enable them to be used to produce derivatives thereof. During the progress of the various gases through the apparatus, absorbed gases leaving each stripper must be cooled and compressed before passing to a subsequent absorber, as will be readily understood by a skilled technician. The yield of the desired gases is very high as a result of the use of high temperature, low pressure pyrolysis, and the recovery of desired gases is also very high because of the method of separation above described.

Only very small amounts of ethylene, acetylene, or propylene are lost, and the other undesired constituents, such as hydrogen, methane, and carbon monoxide, are used as fuel in the furnace, the volume of fuel gases so supplied being usually more than necessary to supply total heat of reaction.

I claim as my invention:

1. A process of separating acetylene and propylene from a mixture of gases containing acetylene, ethylene, and propylene by removing the acetylene and propylene together in polyethylene glycol ether, the amount of polyethylene glycol ether used being sufficient to remove all the propylene.

2. A process of producing commercially valuable ethylene, which comprises: subjecting a hydrocarbon to pyrolytic decomposition in such a manner as to produce a complex gaseous mixture containing ethylene, acetylene, and propylene; and thereafter removing acetylene and propylene from said mixture by absorbing same in a polyethylene glycol ether.

3. A process of producing a derivative of acetylene, which comprises: subjecting a hydrocarbon to pyrolytic decomposition in such a manner as to produce a complex gaseous mixture containing ethylene, propylene, and acetylene; removing said acetylene and propylene from said mixture by absorbing same in a polyethylene glycol ether absorbing medium; stripping said medium to form a secondary gas containing acetylene and propylene; and processing said secondary gas to produce the desired derivative of acetylene.

4. A process of producing commercially valuable ethylene and a derivative of acetylene, which comprises: subjecting a hydrocarbon to pyrolytic decomposition in such a manner as to form a complex gaseous mixture containing ethylene, propylene, and acetylene; absorbing said propylene and acetylene in a polyethylene glycol ether absorbing medium, leaving a residual gas containing ethylene; stripping said absorbing medium containing the acetylene and propylene to produce a secondary gas containing propylene and acetylene; and processing said secondary gas to produce the desired derivative of acetylene.

5. In a process of producing desired valuable products from a stock gas mixture containing a substantial proportion of propane, the steps of: subjecting the stock gas to pyrolytic decomposition to form a primary gaseous mixture containing acetylene, ethylene, and propylene; contacting said primary gaseous mixture with a polyethylene glycol ether, and continuing such contacting under such conditions and for a sufficient period to cause all of said acetylene and propylene and a portion of said ethylene to be absorbed in said polyethylene glycol ether, leaving a gaseous mixture containing substantial amounts of ethylene but free from acetylene and propylene.

6. A process of producing derivatives of ethylene free from propane or its derivatives from a stock mixture of gases containing substantial amounts of propane, which comprises: subjecting said stock mixture to pyrolytic decomposition in such a manner as to form a primary gaseous mixture containing acetylene, ethylene, and propylene; contacting said primary gaseous mixture with a polyethylene glycol ether; continuing said contacting under such conditions and for a sufficient period to cause all of said acetylene and propylene and a portion of said ethylene to be absorbed in said polyethylene glycol ether, leaving a secondary gaseous mixture containing substantial amounts of ethylene but free from acetylene and propylene; and thereafter utilizing said secondary gaseous mixture to produce the desired ethylene derivative, the gases from said process not used in producing said ethylene derivative being used to provide the heat absorbed in said pyrolytic decomposition.

7. A process of producing derivatives of acetylene and ethylene from a stock mixture of gases containing substantial amounts of propane, which comprises: subjecting said stock mixture to pyrolytic decomposition in such a manner as to form a primary gaseous mixture containing acetylene, ethylene, and propylene; contacting said primary gaseous mixture with a polyethylene glycol ether; continuing said contacting under such conditions and for a sufficient period to cause all of said acetylene and propylene and a portion of said ethylene to be absorbed in said polyethylene glycol ether, leaving a secondary gaseous mixture containing substantial amounts of ethylene but free from acetylene and propylene; thereafter utilizing said secondary gaseous mixture to produce the desired ethylene derivative; stripping the acetylene and propylene from the polyethylene glycol ether to produce a tertiary gaseous mixture containing acetylene and propylene; and thereafter utilizing said tertiary gaseous mixture to produce acetylene derivatives, the waste gases not used in producing said ethylene and acetylene derivatives being used to provide the heat absorbed in said pyrolytic decomposition.

RUDOLPH LEONARD HASCHE.

REFERENCES CITED

The following references are of record in the file of this patent:

UNITED STATES PATENTS

| Number | Name | Date |
| --- | --- | --- |
| 1,965,100 | Groll et al. | July 3, 1934 |
| 2,180,386 | Balcar | Nov. 21, 1939 |
| 2,183,148 | Murphree | Dec. 12, 1939 |
| 2,236,978 | Taylor | Apr. 1, 1941 |
| 2,238,490 | Hasche | Apr. 15, 1941 |
| 2,395,362 | Welling | Feb. 19, 1946 |